Sept. 2, 1930.   H. D. COLMAN   1,774,592
SKEIN LACING MACHINE
Filed Oct. 12, 1927   10 Sheets-Sheet 1

INVENTOR
Howard D. Colman
BY
ATTORNEYS

Sept. 2, 1930.  H. D. COLMAN  1,774,582
SKEIN LACING MACHINE
Filed Oct. 12, 1927  10 Sheets-Sheet 2
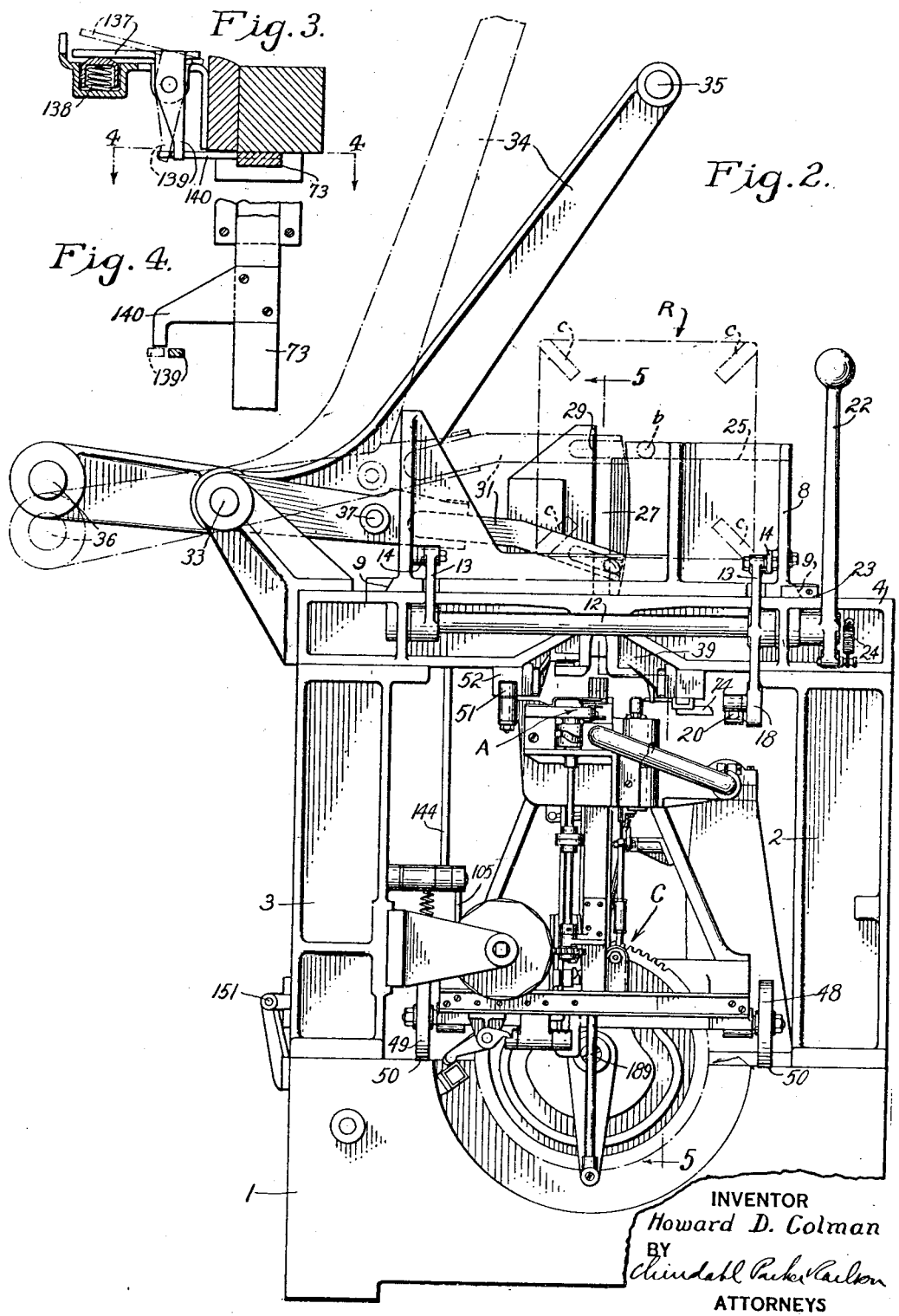

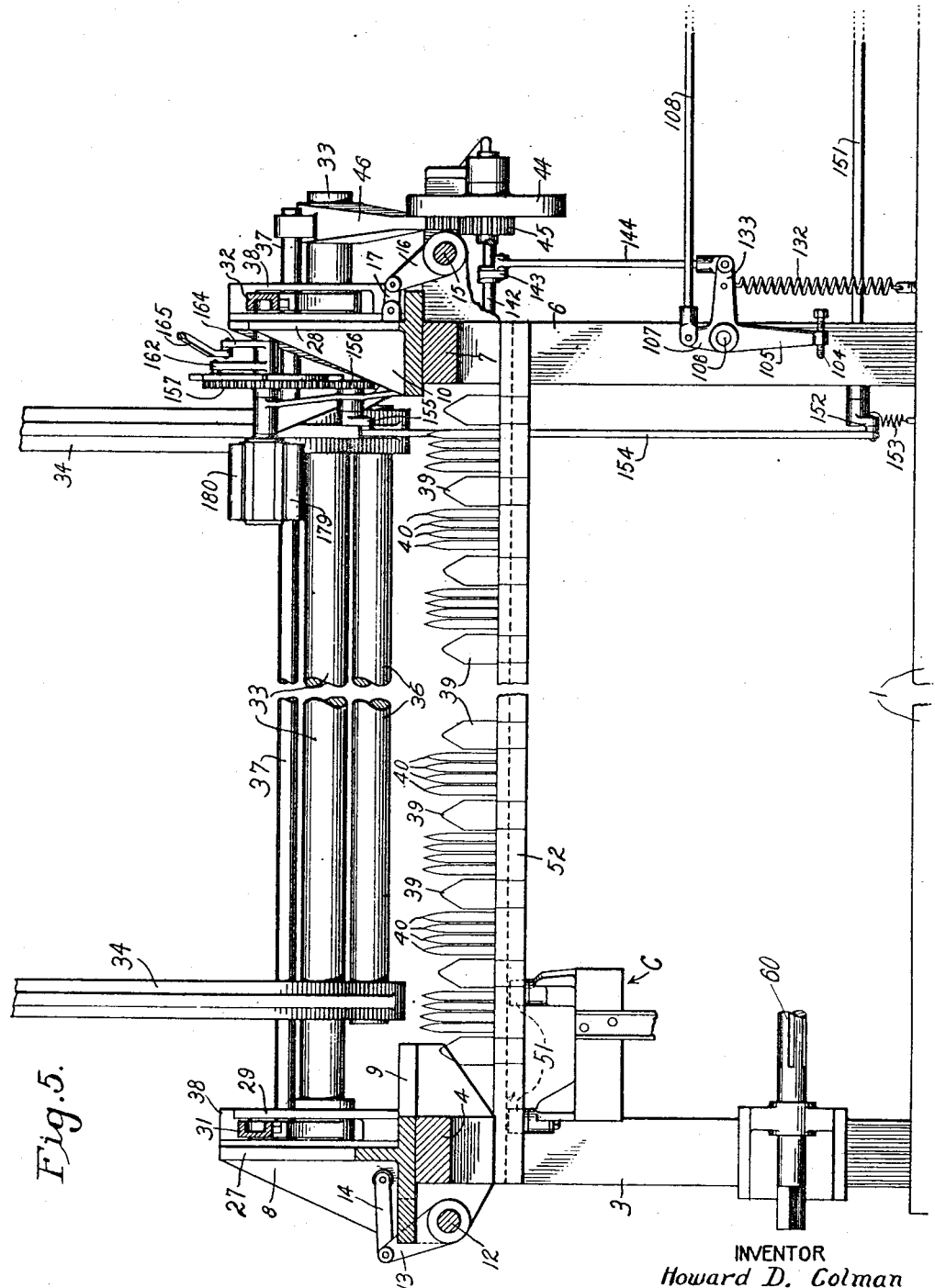

Sept. 2, 1930.   H. D. COLMAN   1,774,592
SKEIN LACING MACHINE
Filed Oct. 12, 1927   10 Sheets-Sheet 4
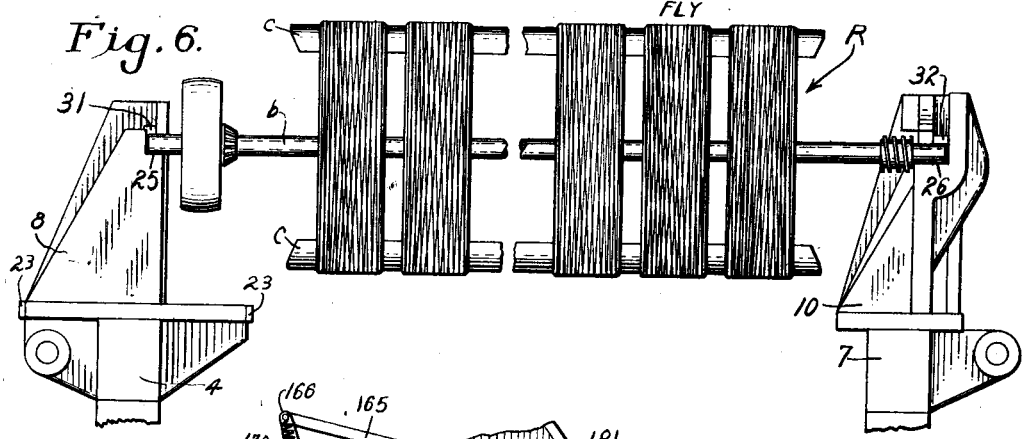
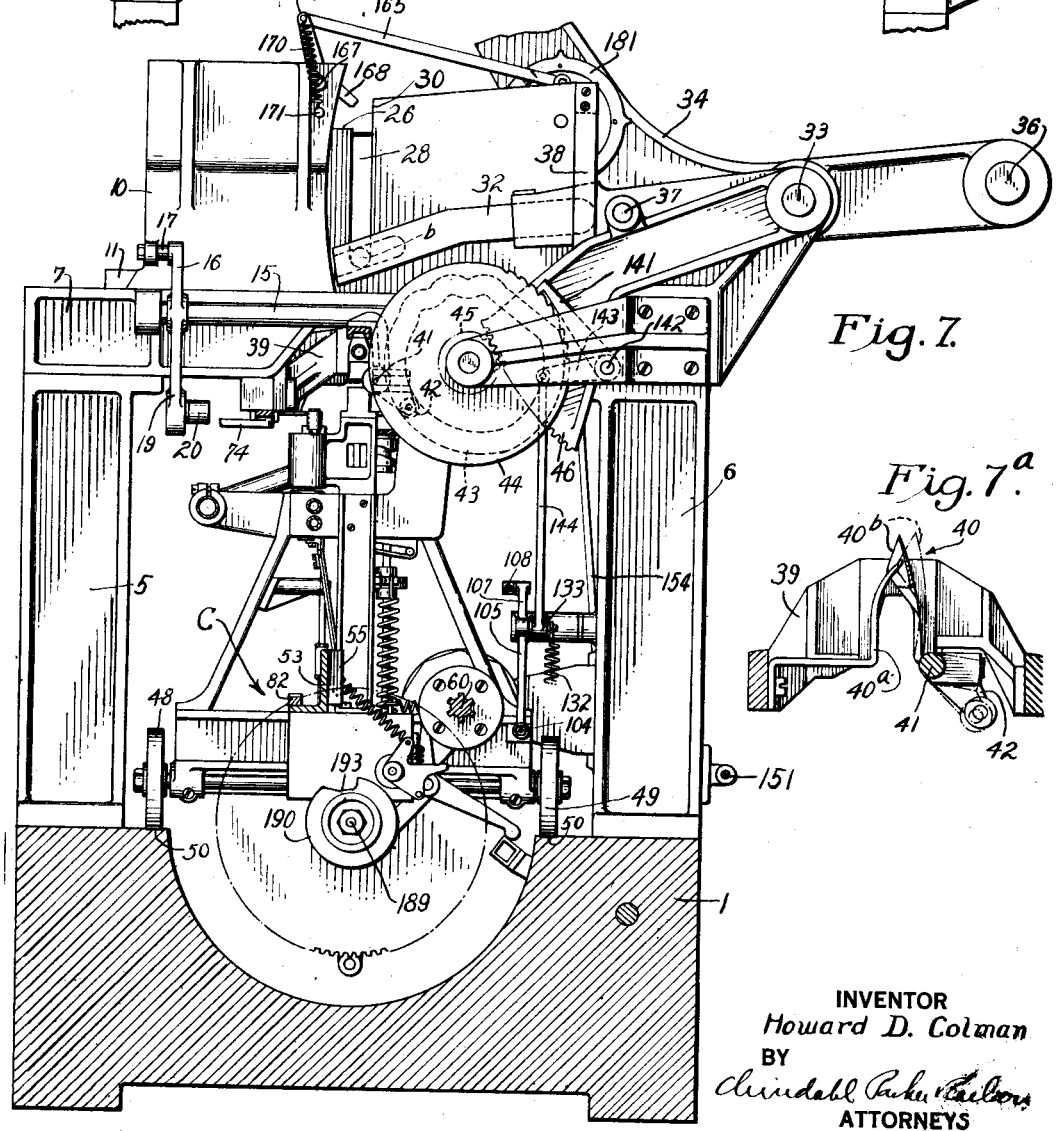
INVENTOR
Howard D. Colman
BY
ATTORNEYS

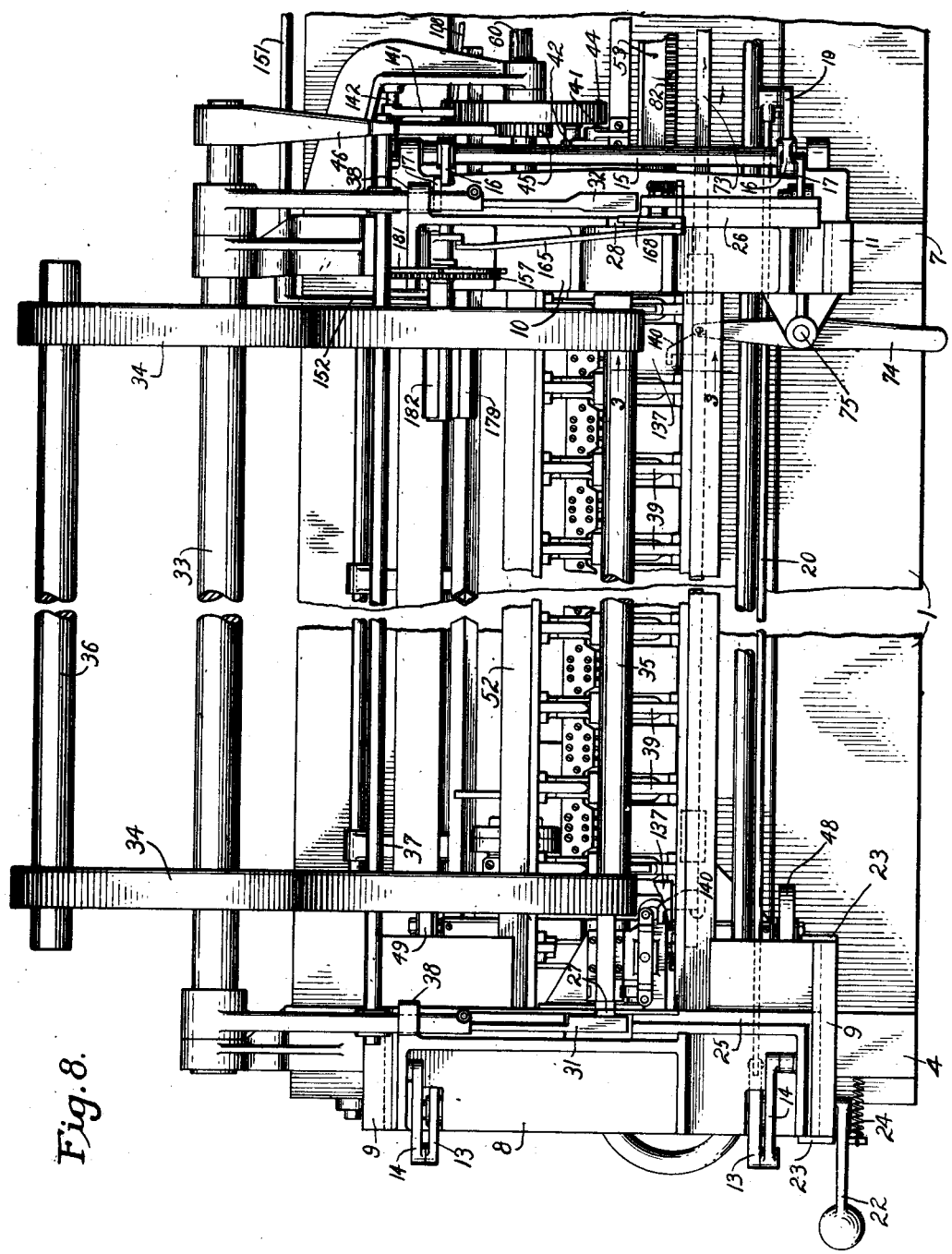

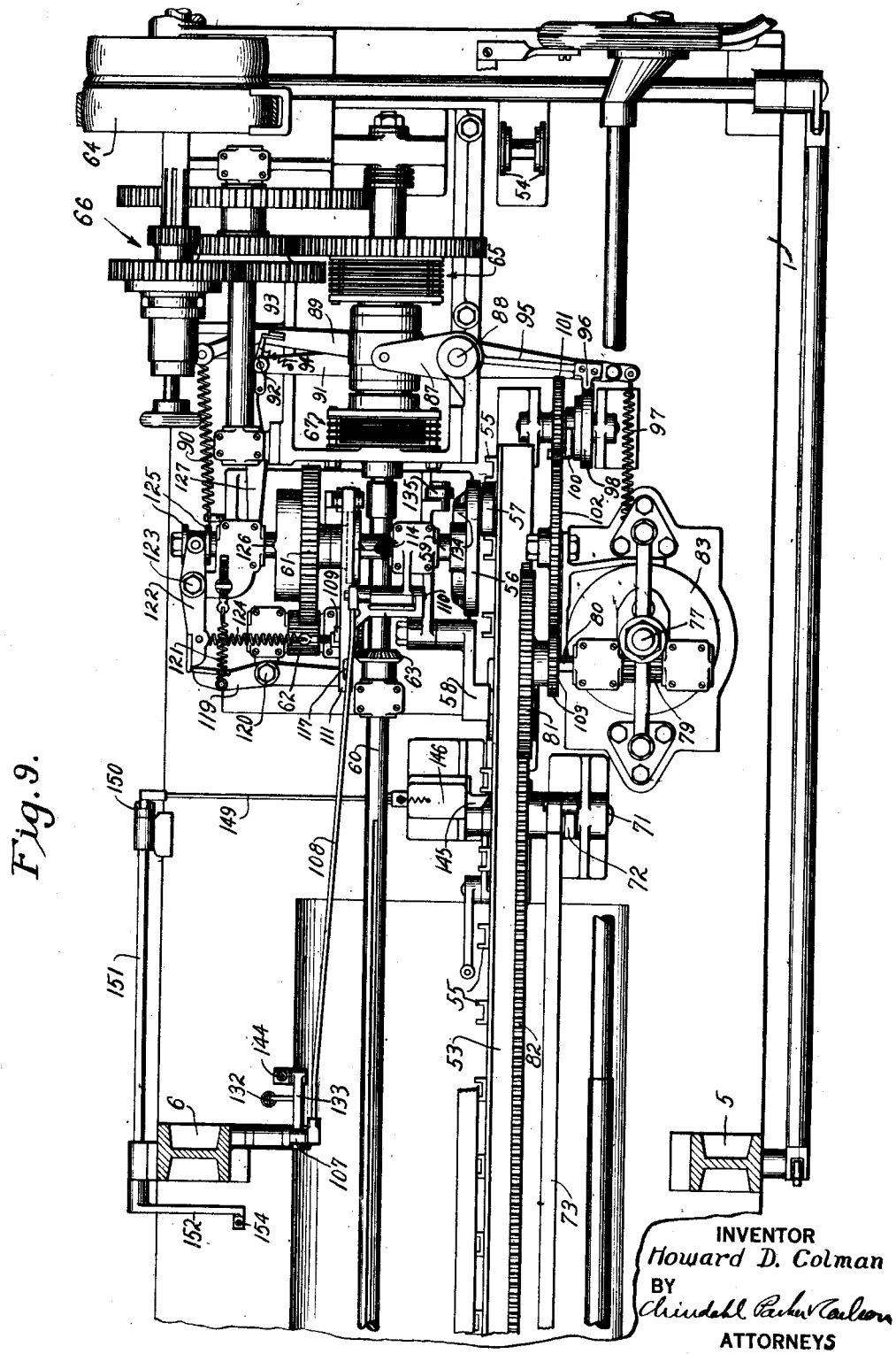

Sept. 2, 1930.  H. D. COLMAN  1,774,592
SKEIN LACING MACHINE
Filed Oct. 12, 1927  10 Sheets-Sheet 8
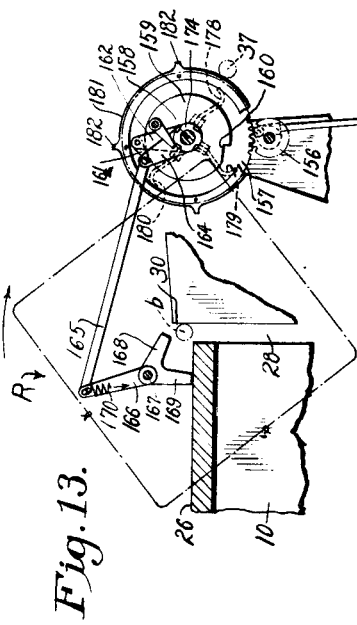
Fig.13.
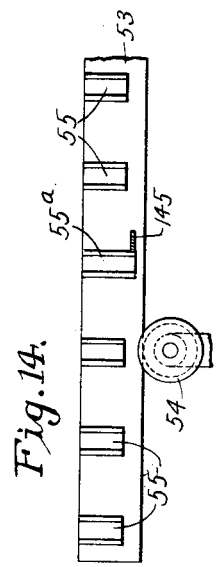
Fig.14.
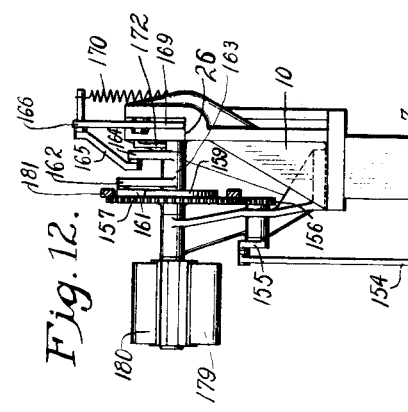
Fig.12.
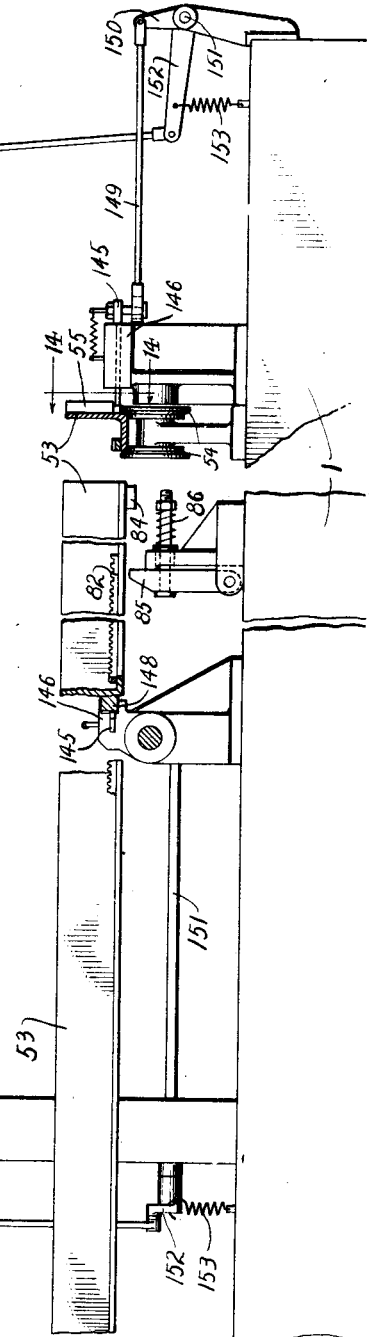
INVENTOR
Howard D. Colman
BY
ATTORNEYS.

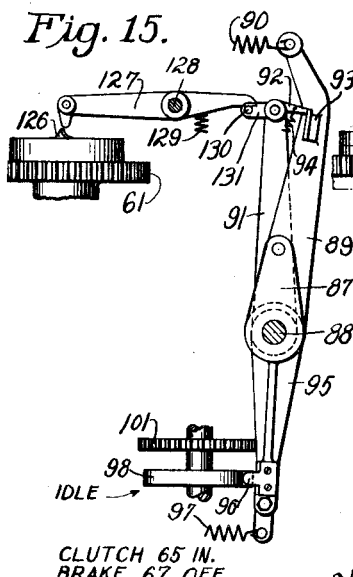
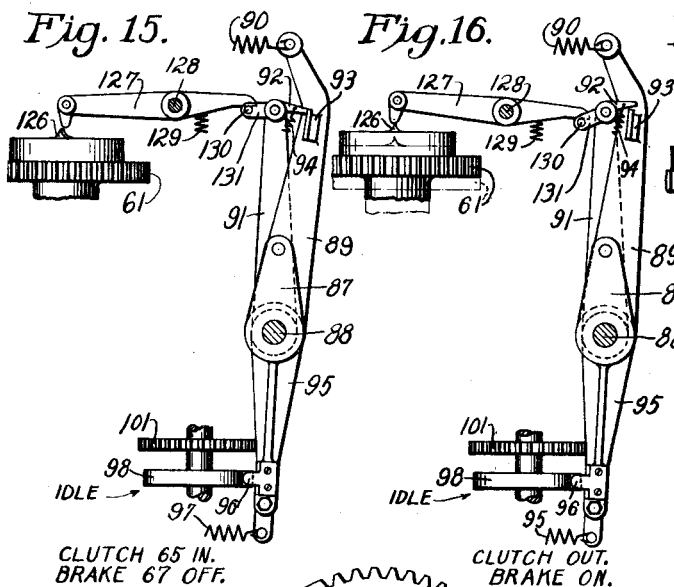
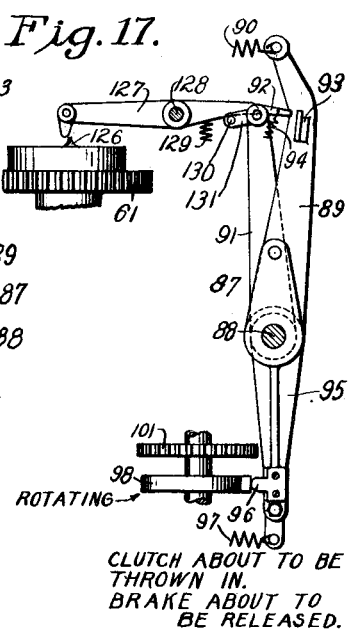
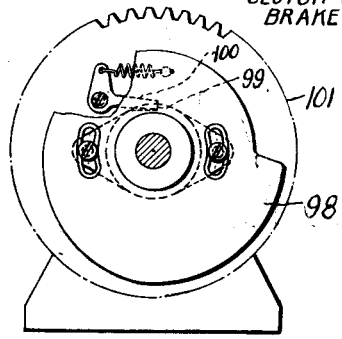
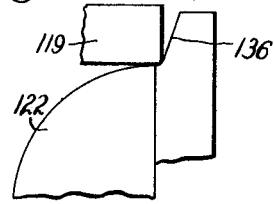
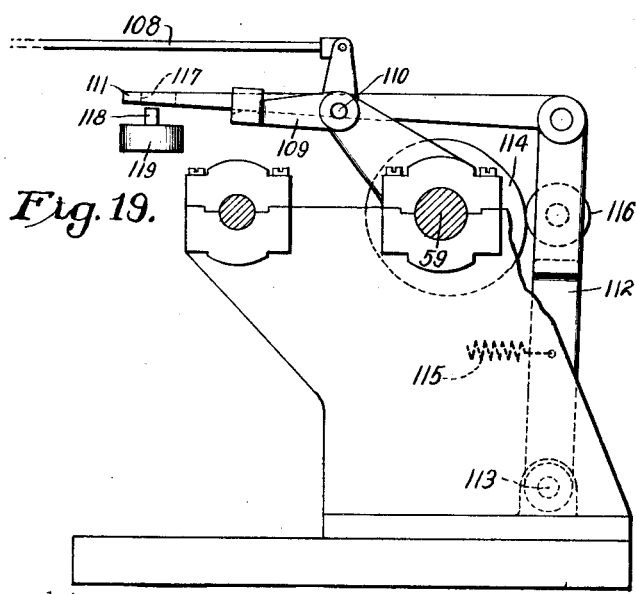
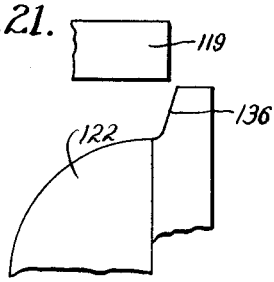

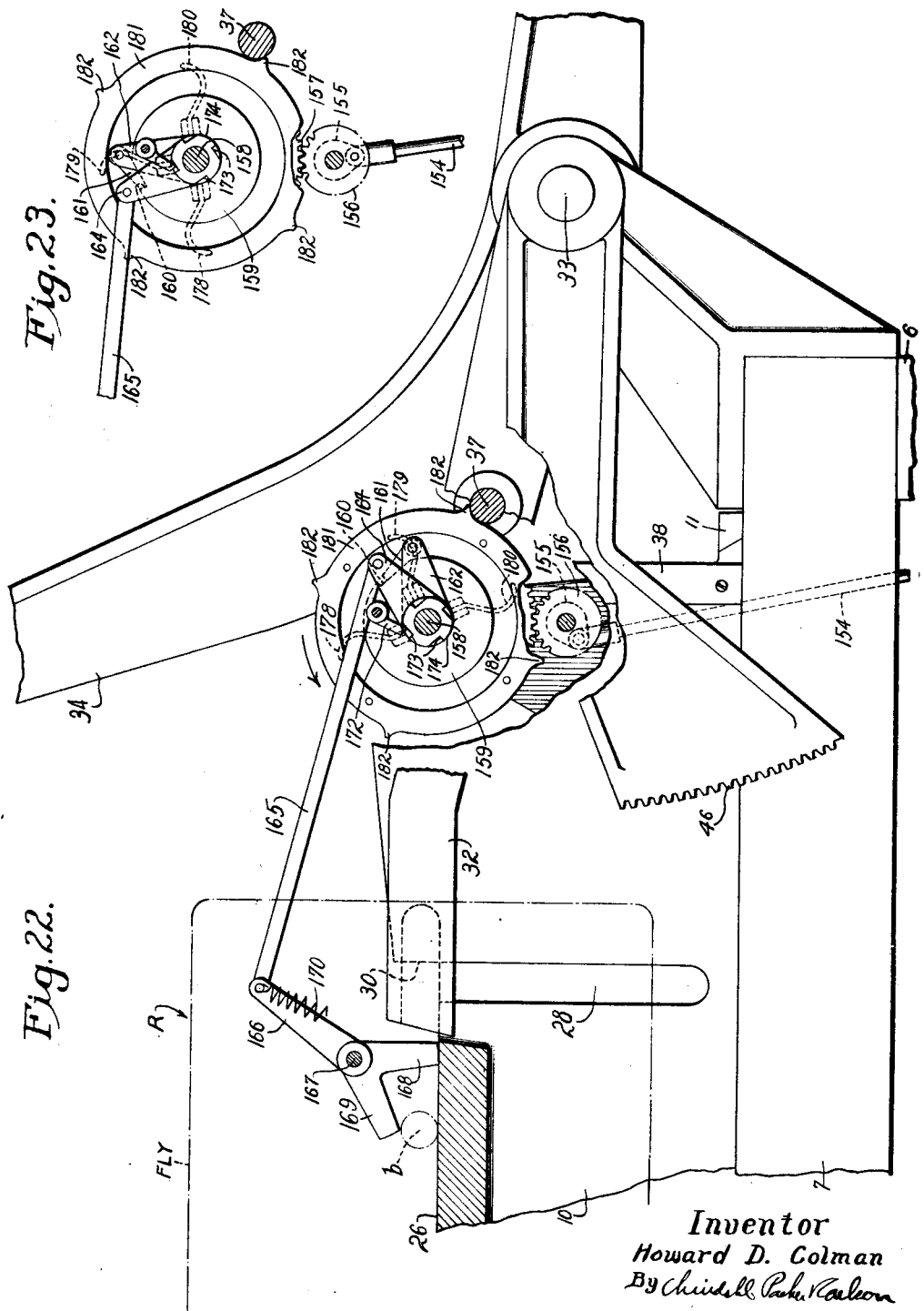

Patented Sept. 2, 1930

1,774,592

UNITED STATES PATENT OFFICE

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS

SKEIN-LACING MACHINE

Application filed October 12, 1927. Serial No. 225,621.

This invention relates to machines for lacing skeins of tram, organzine, rayon, or other material. The reels or flies upon which such material is commonly wound consist of four parallel bars set at equidistant intervals around and spaced away from an axis or shaft. Usually a plurality of skeins are wound side by side upon a fly. The machine herein shown is adapted to lace all four sides of each skein carried by a fly.

My application Serial No. 105,684, filed April 30th, 1926, discloses a skein-lacing machine comprising automatic mechanism for feeding a fly into the machine, for lowering the fly into operative relation to the lacing mechanism, for raising the fly out of operative relation to the lacing mechanism and indexing the fly so as to present all four sides to the lacing mechanism, and for discharging the completely laced fly.

The object of the present invention is to provide a skein-lacing machine into which the fly may be manually inserted and manually withdrawn, and which comprises manually-operable means for lowering the fly into position to be laced, for raising the fly into position to be manually indexed, and for returning the indexed fly into position to be laced.

In the accompanying drawings

Fig. 2 is a left-hand end view of the machine.

Fig. 3 is a vertical sectional view on line 3—3 of Fig. 8, showing a safety mechanism, the operation of which depends upon whether or not the fly is properly seated in the machine.

Fig. 4 is a fragmental plan view taken in the plane of line 4—4 of Fig. 3.

Fig. 5 is a vertical sectional view taken in the plane of line 5—5 of Fig. 2, with certain parts omitted.

Fig. 6 is a fragmental front view showing a fly supported in the machine preparatory to being moved into operative poistion.

Fig. 7 is a vertical sectional view taken in the plane of line 7—7 of Fig. 1.

Fig. 7ª illustrates one of the comb teeth.

Fig. 8 is a fragmental plan view of the left-hand portion of the machine.

Fig. 9 is a plan view of the right-hand portion of the machine.

Figure 10:
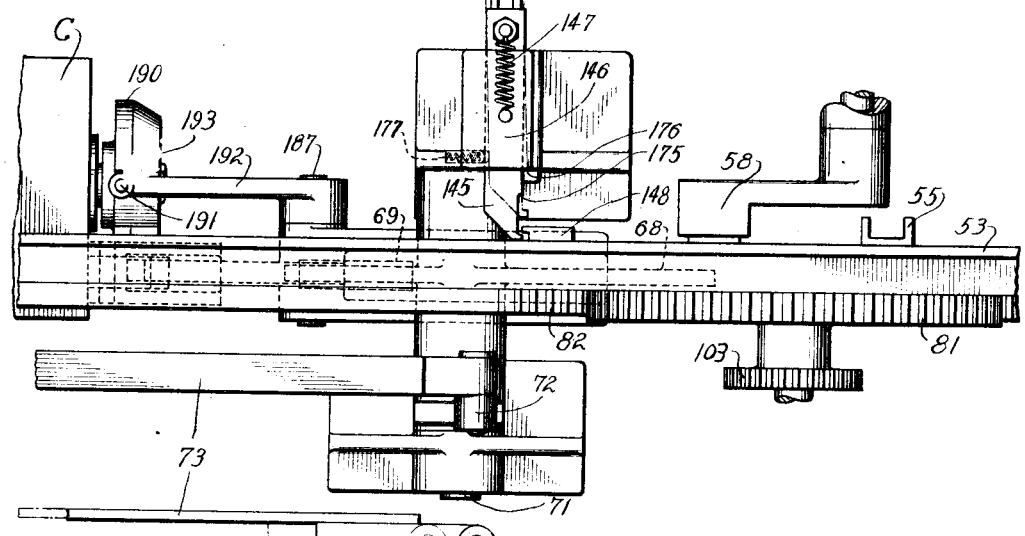

Fig. 10 is a plan view showing certain devices for latching the lacing carriage in the idle or thirteenth position.

Figure 11:
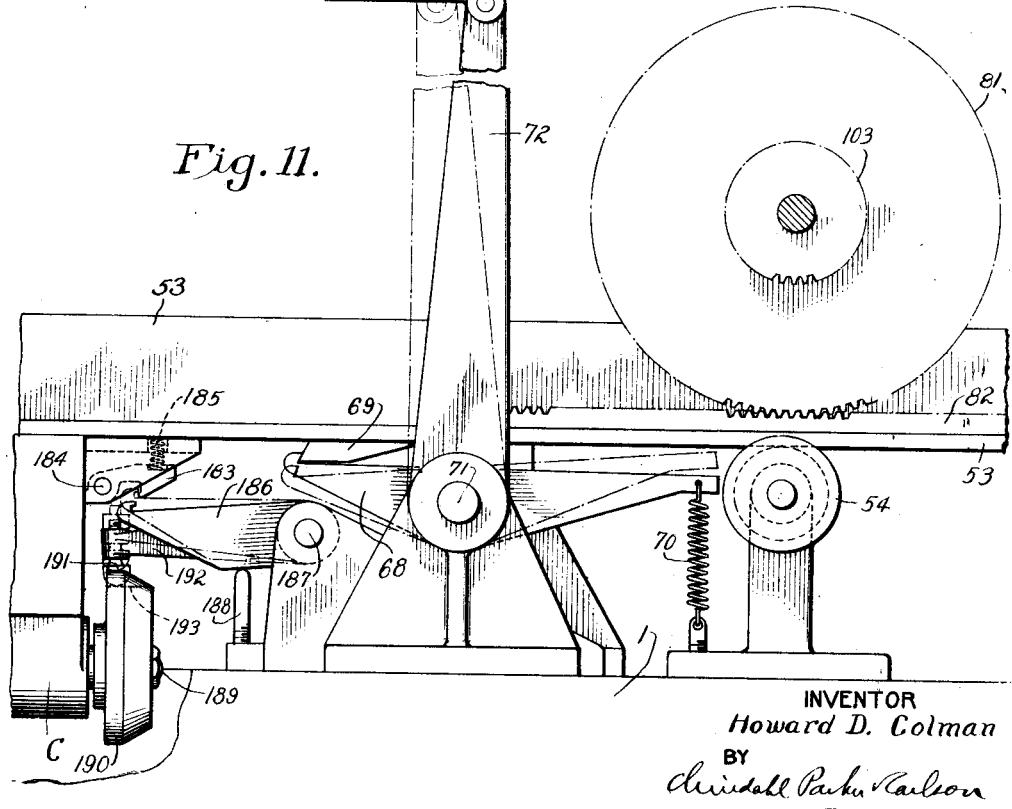

Fig. 11 is a front view of the parts shown in Fig. 10.

Fig. 12 is a fragmental front view showing, among other things, a safety mechanism for insuring indexing of the fly.

Figure 1:
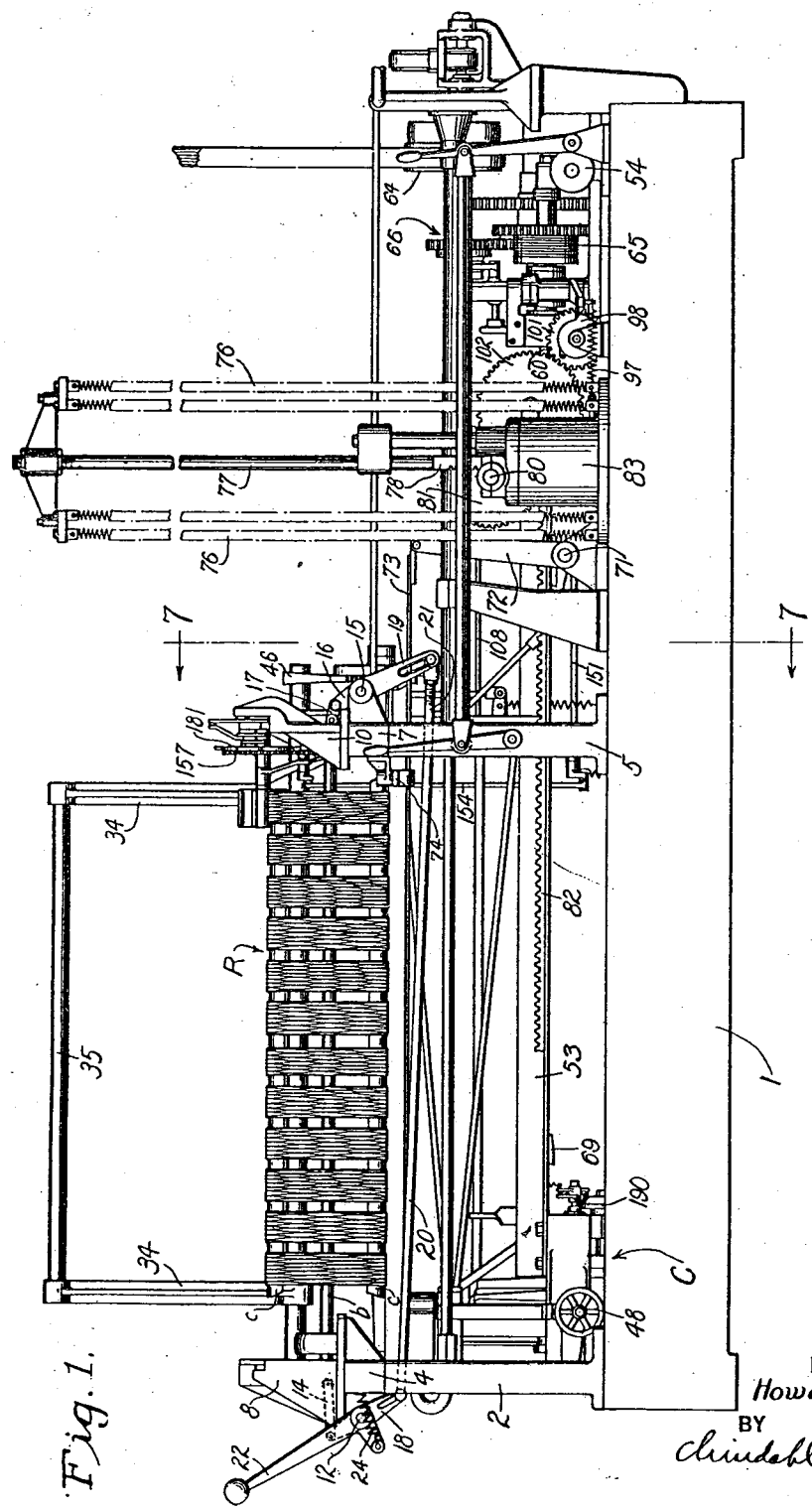
Figure 1 is a front elevation of a skein-lacing machine embodying the features of my invention, certain parts being omitted. The machine is represented as being in operation, the skein-lacing mechanism being about to travel step by step toward the right.

Fig. 13 is a fragmental vertical view taken approximately in the plane of line 7—7 of Fig. 1 and showing the safety mechanism just referred to.

Fig. 14 is a view taken on line 14—14 of Fig. 13.

Figs. 15, 16 and 17 are plan views showing different positions of the mechanisms that control the clutch and the brake.

Fig. 18 illustrates the one-way drive for a cam comprised in said mechanisms.

Fig. 19 illustrates the means for initiating the stoppage of the machine.

Figs. 20 and 21 are fragmental plan views of certain levers comprised in the stopping and starting mechanism.

Fig. 22 is a view similar to Figs. 7 and 13, but showing the parts in another position.

Fig. 23 shows the position assumed upon the introduction of a fly into the machine, the shaft of the fly having passed the finger 168.

The form of fly R shown in Figs. 1, 2 and 6 comprises four bars $c$ supported upon a central shaft $b$. While the embodiment herein shown of my invention is especially adapted to operate upon a four-sided fly having twelve skeins wound thereon, it is to be understood that this is in no way a limitation of the invention, for by making certain changes the mechanism may be adapted to operate upon a fly of any number of sides and skeins.

The main frame of the machine comprises a base 1, two uprights 2 and 3 (Fig. 2) at the left-hand end of the base, a horizontal beam 4 attached to the upper ends of the uprights 2 and 3, two uprights 5 and 6 (Fig. 7) supported about midway of the length of the base 1, and a horizontal beam 7 attached to the upper ends of the uprights 5 and 6. Upon the beams 4 and 7 are mounted castings which are provided with ledges to support the ends of the shaft *b* of a fly.

There are three principal makes of flies, the only important difference, so far as this invention is concerned, residing in the length of the shaft. In order to adapt the machine for operation upon any of said makes of flies, the castings referred to are in the nature of slides which are movable toward and away from each other.

Referring now to Figs. 2 and 5: 8 denotes a slide mounted upon the beam 4 between guides 9. On the beam 7 is a slide 10 which is mounted between guides 11, (Figs. 7 and 22). The means for adjusting the slide 8 comprises a shaft 12 (Figs. 2 and 5) which is mounted in bearings on the beam 4 and which carries two crank arms 13 that are connected to the slide by means of links 14. The slide 10 is arranged to be moved by means of a shaft 15 (Fig. 7) carried by the beam 7 and having two arms 16 (Fig. 8) which are connected to the slide by means of links 17. The shafts 12 and 15 are connected together for synchronous movement by means including an arm 18 (Fig. 1) on the shaft 12, an arm 19 on the shaft 15 and a link 20 connecting said arms. The arms 18 and 19 are longitudinally slotted so that the link 20 may be connected to said arms at varying distances from the shafts 12 and 15, and the link 20 is made adjustable in length, as indicated at 21 in Fig. 1.

In the drawings, the machine is shown as adjusted to operate upon an Atwood fly. To adjust the machine to operate upon Sipp flies, the slides 8 and 10 are shifted toward the right in Fig. 1, the left-hand slide shifting farther than the right-hand slide so as to shorten the distance between the shaft-supporting ledges hereinbefore alluded to while maintaining the skeins in proper vertical planes. To adjust the machine for operation upon Scranton flies (the length of the shaft of which is intermediate those of Atwood and Sipp flies) the points of connection of the link 20 are altered and the length of the link adjusted accordingly.

The means for actuating the shafts 12 and 15 to adjust the slides 8 and 10 comprises a hand lever 22 secured to the forward end of the shaft 12. The throw of the lever 22 is limited by contact of the slide 8 with stops 23 (Fig. 8) on the beam 4. A spring 24 holds the slide 8 in contact with one or the other of said stops.

Upon the adjacent faces of the slides 8 and 10 are formed horizontal ledges 25 and 26, respectively, (Fig. 6) to support the end of the shaft of the fly. At the inner ends of these ledges are vertical slots 27 and 28 (Figs. 2 and 7) to receive the ends of the shaft of the fly. The portion 29 (Fig. 2) of the slide 8 constitutes a stop in alinement with the ledge 25 to limit inward horizontal movement of the left-hand end of the shaft *b* of the fly. Similarly, the part 30 (Fig. 7) limits inward horizontal movement of the right-hand end of the fly shaft.

The means for lowering the fly onto the comb which divides the skeins into bundles of strands comprises two arms 31 and 32 which are mounted upon a shaft 33. The means for swinging the arms 31 and 32 to lower and raise the fly comprises two arms 34 which are fixed upon the shaft 33 and connected at their forward upper ends by means of a hand rod 35. The arms 34 are extended rearwardly of the shaft 33 and there carry a counterweight 36. A rod 37 extends through the arms 31, 32 and 34. In order that the arms 31 and 32 may be adjusted to correspond with the length of the shaft of the fly to be operated upon, said arms are slidably mounted upon the shaft 33 and the rod 37. As shown in Figs. 5 and 8, the arms 31 and 32 extend through guides 38 which are fixed to the slides 8 and 10 whereby the arms 31 and 32 are caused to move with said slides when the latter are being adjusted.

The adjacent faces of the arms 31 and 32 are channeled, as shown in Figs. 2, 5 and 7, to receive the ends of the shaft of the fly. The channeled ends of said arms extend across the slots 27 and 28, as indicated in Figs. 2 and 7. When said arms are in their upper position (which is determined by contact of said arms with the guides 38), the channeled ends of the arms are in alinement with the ledges 25 and 26. See Fig. 22.

The means for dividing the skeins into bundles of strands may be of any suitable construction. For example, it may be a comb such as that fully illustrated and described in said application Serial No. 105,684. Said comb comprises a series of skein spacers 39 (Fig. 5) arranged at intervals corresponding to the spaces between the skeins on the fly. Interposed between the skein spacers 39 are groups of comb teeth or skein piercers. The comb is supported by the beams 4 and 7 in the vertical plane passing through the slots 27 and 28. As disclosed in said application, each of the skein piercers 40 comprises a stationary member $40^a$ and a movable member $40^b$. As the fly is being lowered on to the comb the movable elements $40^b$ of the skein piercers are rapidly oscillated lengthwise of the skeins (i. e., toward and away from the observer in Fig. 5), whereby the comb teeth are enabled to work their way through the skeins and divide them into bundles without injuring the silk. The means for thus oscillating or vibrating the movable elements of the comb teeth is generally similar to that fully disposed in said application, the movable elements 40ᵇ being secured together to rock with a shaft 41 (Fig. 7). On said shaft is a crank arm 42 carrying a roller which runs in the groove 43 of a cam disk 44. Said disk is rotatably supported in the machine frame and is arranged to be rotated by means comprising a pinion 45 (Fig. 8) which is fixed to the cam disk and which meshes with a gear segment 46 that is carried by the shaft 33 and the rod 37. As shown in Fig. 7, the cam groove 43 includes a series of small rises and falls which cause the movable elements of the comb teeth to be rapidly vibrated through a short arc. The cam groove 43 also comprises a portion arranged to swing the movable tooth elements well away from the stationary elements and hold them away to allow the laces to be withdrawn from the comb as the fly is being lifted off the comb.

The mechanisms for passing a lacing cord around the bundles and for tying together the ends of the cord are indicated generally at A in Fig. 2 and are mounted upon a carriage C having wheels 48 and 49 which travel upon tracks 50 on the base 1. The upper portion of the carriage is guided by means of rollers 51 (Fig. 5) which run within a grooved guide bar 52 (Fig. 2) fixed to the beams 4 and 7. For a full disclosure of a mechanism A and a carriage C adapted for use with the present invention, reference may be made to my said application Serial No. 105,684 or to my application Serial No. 272,029, filed April 23, 1928.

The carriage C is given its working stroke by mechanisms which move it step by step from left to right in Fig. 1. The knotter unites the ends of the lacing of one skein while the lacing mechanism is lacing the skein in the van. In view of this, since there are twelve skeins, it is apparent that the knotter must operate an extra time in order to unite the ends of the lacing of the twelfth skein. The position occupied by the carriage while the lacing of the twelfth skein is being tied is hereinafter termed the thirteenth position.

Upon completing the working stroke the carriage is latched in the thirteenth position to provide an interval during which the operator may index the fly or substitute another. When the operator is ready, he unlatches the carriage, whereupon spring means returns the carriage to its starting position.

The means herein shown for reciprocating the carriage C is similar to that fully disclosed in said Colman application and comprises an indexing bar 53, one end of which is rigidly secured to the carriage. The indexing bar 53 is guided and supported by means of rollers 54 (Figs. 13 and 14) on the base 1. Blocks 55 are secured to the rear side of the carriage-indexing bar, these blocks being spaced at intervals equal to the distance between the centers of adjacent skeins. The means for moving the carriage step by step during its working stroke comprises a disk 56 carrying an eccentrically mounted roller 57 adapted to roll through the space between adjacent blocks 55 and to have rolling engagement with the leading block. While the roller 57 is out of engagement with the bar 53, the carriage is locked in position by means of a lever 58 (Fig. 9) adapted to engage the successive blocks 55, as fully described in said Colman application.

The disk 56 is fixed to a shaft 59 which is driven from a shaft 60 by a gear train 61, 62 and 63. (The shaft 60 also drives the mechanisms on the carriage C, said shaft having a spline connection with said mechanisms as indicated in Figs. 5, 7 and 9.) The shaft 60 is driven from a pulley 64 through a multiple-disk clutch 65 and the gear train 66. 67 is a multiple-disk brake for promptly stopping the drive upon the completion of the working stroke of the carriage.

The latch 68 (Fig. 11) for holding the carriage at the end of the working stroke against the tension of the spring means hereinbefore alluded to is adapted to engage a block 69 secured to the underside of the indexing bar 53. 70 is a spring to hold the latch in operative position. The latch 68 is fixed to a pivot 71 which carries a lever 72. To the lever 72 is pivoted one end of a bar 73 (Figs. 8 and 9) which extends alongside the comb. A starting hand lever 74 is pivoted between its ends at 75 and is connected at its rear end to the bar 73. It will be seen that when the lever 74 is swung to the right in Fig. 8, the latch 68 will be disengaged from the block 69, thereby releasing the carriage to the action of the spring means which returns the carriage to starting position beneath the first skein (the skein farthest to the left in Fig. 1). Said means comprises tension springs 76 (Fig. 1) which are anchored at their lower ends and are connected at their upper ends to the upper end of a rod 77. Said rod is provided with a rack 78 that meshes with a pinion 79 (Fig. 9). The pinion 79 is fixed to a shaft 80 which carries a spur gear 81 that meshes with a rack 82 on the carriage-indexing bar 53. 83 is a dashpot, the piston of which is connected to the rod 77. As the carriage reaches its operative position beneath the first skein a block 84 (Fig. 12) on the lower side of the indexing bar 53 strikes a buffer 85 on the bed 1, the spring 86 of said buffer absorbing some of the shock.

The means for preventing the roller 57 (Fig. 9) from operating on the indexing bar 53 while the carriage C is being returned to initial position by the springs 76 and until after the first skein has been laced, comprises means for sliding the shaft 59 endwise so as to place the roller 57 out of position to engage the blocks 55. Said means will be described hereinafter.

The means for operating the clutch 65 and the brake 67 comprises a fork 87 (Fig. 9) which is pivoted at 88 and is rigid with a lever 89. The latter is acted upon by a tension spring 90 which tends to swing the fork 87 in the direction to throw out the clutch and apply the brake. The means for controlling the spring 90 comprises a lever 91 pivoted on the axis 88 and carrying a dog 92 (Fig. 15) which is normally held in position to engage a lug 93 on the lever 89 by means of a spring 94. Rigid with the lever 91 is an arm 95 having a projection 96 which is held by a tension spring 97 in engagement with a cam 98. The cam 98 is arranged to be driven by power derived from the carriage-returning springs 76. As shown in Fig. 18, the hub of the cam 98 has a notch 99 adapted to be engaged by a pawl 100 carried by a spur gear wheel 101. The gear wheel 101 meshes with a spur gear 102 that meshes with a pinion 103 which is rigid with the gear wheel 81. It will be seen that when the springs 76 are acting to return the carriage C to initial position, the cam 98 is being rotated. As the carriage reaches the position where it can operate upon the first skein, the high point of the cam 98 passes the projection 96, whereupon the spring 97 moves the lever 95 to the left, as viewed in Figs. 9 and 15. This causes the arm 91 to swing toward the right, whereby the dog 92 pushes the lever 89 toward the right against the tension of the spring 90, thus throwing in the clutch 65 and releasing the brake 67. The carriage C thereupon commences to travel step by step beneath the fly.

As the carriage reaches the thirteenth position, it engages a stop screw 104 carried by an arm 105 which is pivoted at 106 in the machine frame. The arm 105 is rigid with an arm 107 to which is connected a link 108. The right-hand end of the link 108 is pivoted to one arm of a bell crank lever 109 (Fig. 19) which is pivoted at 110. The other arm of said bell crank lever serves to guide and support a bar 111 which is pivoted at its right-hand end to the upper end of a lever 112 which is pivoted in the machine frame at 113. During the operation of the machine, the lever 112 is continuously swung by means of a cam 114 fixed on the shaft 59, a contractile spring 115 serving to hold a roller 116 on said lever in contact with the cam.

In the left-hand end of the bar 111 is an elongated opening 117 (Fig. 9) adapted to receive a pin 118 on one end of a lever 119. The lever 119 is pivoted at 120 in the machine frame. The rear arm of the lever 119 is normally held by a tension spring 121 in engagement with the left-hand arm of a lever 122 which is pivoted in the machine frame at 123. A tension spring 124 tends to hold the lever 122 in engagement with the lever 119. The right-hand end of the lever 122 carries a roller that lies between collars 125 on the rear end of the shaft 59.

When the carriage C strikes the stop screw 104 (Fig. 5), the link 108 is drawn toward the left (Figs. 5, 9 and 19), thereby lowering the slotted bar 111 so that the pin 118 lies within the slot 117. The rotation of the cam 114 causes the bar 111 to be moved toward the right, thereby swinging the lever 119 (Fig. 9) against the tension of the spring 121, whereby the rear end of the lever 119 is withdrawn from the lever 122, thus allowing the spring 124 to swing the lever 122 in the direction to slide the shaft 59 rearwardly. The roller 57 is thus withdrawn from position to engage the blocks 55, whereby the working stroke or step-by-step movement of the carriage is suspended, the carriage being then in the thirteenth position. At the same time the latch 68 (Fig. 11) engages the block 69 on the indexing bar 53, thereby holding the carriage C against the tension of the springs 76.

As the carriage C thus completes its step-by-step movement, means to be now described disengages the dog 92 from the lug 93 and thus allows the spring 90 to throw out the clutch and apply the brake. On one side of the spur gear wheel 61 is a cam projection 126 (Figs. 9 and 15). When the carriage-indexing shaft 59 is slid out of operative relation to the indexing bar 53, the gear wheel 61 is also moved into such position (see Fig. 16) that the cam projection 126 may engage a projection on the left-hand end of a lever 127 which is pivoted in the machine frame at 128. An expansive spring 129 normally holds the other arm of the lever 127 out of contact with a pin 130 on a lug 131 rigidly attached to the dog 92. Engagement of the cam 126 with the lever 127 disengages the dog 92 from the lug 93, whereupon the spring 90 moves the arm 89 and the fork 87 to the left, thereby throwing out the clutch 65 and applying the brake 67. The entire machine thus comes to rest.

When the carriage C is subsequently released to the action of the springs 76, it moves away from the stop screw 104 (Fig. 5), whereupon a tension spring 132 attached to an arm 133 which is rigid with the arms 105 and 107 causes the link 108 to be pushed toward the right, thereby raising the slotted bar 111 out of engagement with the pin 118. When the carriage C reaches operative position beneath the first skein (the one farthest to the left), the cam 98 allows the spring 97 to throw in the clutch and release the brake, as hereinbefore described. As the crank disk 56 begins to revolve, a cam flange 134 (Fig. 9) on the rear face of said disk engages an anti-friction roller 135 mounted in the machine frame, whereby in the continuing rotation of the crank disk the shaft 59 is slid forward to place the roller 57 in position to operate on the blocks 55. At the same time, the cam 126 is withdrawn out of range of the projection on the lever 127, and the lever 122 is swung against the tension of the spring 124 to allow the lever 119 to move into engagement with said lever 122, as shown in Fig. 9. As illustrated in Figs. 20 and 21, the end of the lever 122 is provided with a cam surface 136. When the lever 119 is being drawn away from the cam surface 136 by the bar 111, the spring 124 is restrained by said cam surface and thus prevented from driving the cam 134 violently against the roller 135. The retreat of the cam 134 as it rolls past the roller 135 allows the spring 124 to withdraw the shaft 59 gradually. When the lever 119 is returned into engagement with the lever 122 the cam surface 136 causes the lever 122 to be given a slight additional forward movement so that the cam 134 shall clear the roller 135 in the succeeding revolutions of the crank disk 56.

Means is provided to prevent the operator from setting the machine in operation until a fly has been properly seated on the comb. This means comprises two feeler plates 137 (Fig. 3), one being provided for each end of the comb in position to be depressed by engagement with the end skeins of the fly. Only a fragment of the left-hand plate 137 is visible in Fig. 8. Expansive springs 138 (Fig. 3) normally hold the feeler plates 137 in elevated position, as indicated in dotted lines in Fig. 3. Rigid with each feeler plate 137 is a downwardly extending arm 139. On the slide bar 73 are two angular projections 140 (Figs. 4 and 8). When the feeler plates 137 are held depressed by a properly seated fly, the projections 139 are in the position shown in full lines in Figs. 3 and 4, and consequently are out of the path of movement of the projections 140, but if either end of the fly is not properly seated, one or both of the lugs 139 will occupy the position shown in dotted lines in Figs. 3 and 4, thus preventing the bar 73 from being moved toward the left in Figs. 8 and 11, and thereby preventing the operator from actuating the starting hand lever 74 to withdraw the latch 68 from the block 69.

Means is provided to prevent the fly from being raised at any time after the carriage has started toward its initial position (below the farthest leftward skein) and before the carriage has returned to its idle or thirteenth position. This means comprises a dog 141 (Fig. 7) which is pivoted at 142 and is arranged to engage ratchet teeth formed on the periphery of the cam disk 44. Rigid with the dog 141 is an arm 143 which is connected by means of a link 144 to the arm 133. As soon as the carriage starts toward the left, the spring 132 places the dog 141 in engagement with the disk 144 and thereby prevents the operator from lifting the hand rod 35.

Means is provided to prevent the carriage C from being returned to initial position until after the fly has been indexed or until after a completely-laced fly has been replaced with another fly. Said means comprises a secondary latch 145 (Fig. 10) slidably mounted in a guide 146 and arranged to be projected by a tension spring 147 into the path of a locking block 148 on the indexing bar 53. If the operator should withdraw the primary latch 68 from the block 69 while the latch 145 is in the forward position shown in full lines in Fig. 10, the carriage will move to the left a fraction of an inch until the block 148 stops against the latch 145. The latch 145 has a pin-and-slot connection with a link 149 (Fig. 13) that is pivoted to an arm 150. The latter is fixed to a shaft 151 (Fig. 9) on which is secured an arm 152. A spring 153 tends to move said arm 152 downwardly. A link 154 (Figs. 5, 12 and 13) connects the arm 152 to an arm 155 which is rigid with a pinion 156. The latter meshes with a gear wheel 157 which is fixed on a shaft 158. The arm 155, pinion 156 and shaft 158 are supported on the slide 10. Fast on the shaft 158 is a disk 159 (Fig. 22) having in its periphery a single tooth or recess 160 adapted to be engaged by a pawl 161. Said pawl is pivoted upon an arm 162 which is rigid with a sleeve 163 (Fig. 12). Also rigid with the sleeve 163 is an arm 164 which is connected by means of a link 165 to an arm 166 (Fig. 22) which is pivoted at 167 on the slide 10. Two fingers 168 and 169 are rigid with the arm 166 and overhang the ledge 26. A spring 170 is connected at one end to the upper end of the arm 166 and is anchored at its other end to a pin 171 (Fig. 7) directly below the axis 167. It will thus be seen that the spring 170 tends to hold the arm 166 at either side of its axis of oscillation, with one of the fingers 168 and 169 bearing against the ledge 26. To prevent reverse movement of the shaft 158, there is provided a dog 172 (Fig. 22), said dog being pivoted on the slide 10 in position to engage in any one of four equidistant notches 173 in a collar 174 fixed on the shaft 158.

When the operator pushes a fly rearwardly along the ledges 25 and 26 (see Fig. 22), the right-hand end of the shaft $b$ of the fly engages the finger 168 and causes said finger to swing rearwardly until the upper end of the arm 166 is at the forward side of a straight line joining the points 167 and 171 (Fig. 7), whereupon the spring 170 moves the fingers 168 and 169 into the position shown in Figs.

7 and 13. The movement thus imparted to the finger 168 is transmitted through the arm 166, the link 165, the arm 164 and the sleeve 163 to the arm 162, whereby the pawl 161 is caused to turn the disk 159 through a quarter-revolution from the position shown in Fig. 22. Such quarter-revolution causes retraction of the latch 145. A quarter-revolution of the disk 159 causes one revolution of the pinion 156 and the crank 155. Some of the power to complete the revolution of the crank 155 is furnished by the spring 153. By reference to Fig. 10, it will be seen that there is a shoulder 175 on the latch 145 which is adapted to engage a shoulder 176 within the guide 146. 177 is an expansive spring which tends to move the latch 145 laterally. Near the end of the first half-revolution of the crank arm 155, the latch 145 is retracted far enough to place the shoulder 175 rearwardly of the shoulder 176, whereupon the spring 177 pushes the latch sidewise to place the shoulder 175 directly behind the shoulder 176. Near the beginning of the second half-revolution of the crank arm 155 the latch shoulder 175 stops against the shoulder 176, whereby the latch is held retracted out of position to engage the block 148.

Shortly before the carriage reaches its initial position the indexing block 55ª (Fig. 14), which is a little longer than the other indexing blocks, engages the forward end of the latch 145 and moves said latch to the left, as viewed in Fig. 10, so as to disengage the shoulder 175 from the shoulder 176, whereupon the spring 147 projects the latch 145 forwardly to the position shown in Fig. 10. As the carriage again returns to the thirteenth position, the latch 145 yields rearwardly to allow the locking block 148 to pass and then is again advanced by the spring 147 into position to engage the block 148.

As will be understood from the foregoing, the introduction of a fly into the machine for the lacing of one side thereof causes retraction of the latch 145 to allow the machine to be started. It will also be understood that after the first side of the fly has been laced the latch 145 is again in position to prevent restarting of the machine. In order that the latch 145 shall be retracted each time the fly is indexed for the lacing of the second, third and fourth sides and shall not be retracted in case the operator should inadvertently index the fly more than three times, I provide the means to be now described.

Three arms 178, 179 and 180 are fixed on the shaft 158 in position to be engaged by the corners of a fly which has been raised into position to be indexed. Two of the arms 178 and 180 are diametrically opposite each other, the third arm 179 being midway between the other two. For convenience, the three-arm structure just described may be termed a star wheel. The movement imparted to the star wheel by the engagement of a corner of the fly with one of the arms 178, 179 and 180 causes the pinion 156 and the crank arm 155 to turn through one revolution, power to complete the revolution being supplied by the spring 153 (Fig. 13). The latch 145 is thereby retracted. By reference to Figs. 22 and 23, it will be seen that when the disk 159 is turned by reason of the introduction of a fly for the lacing of one side of the latter, the three-arm star wheel will be turned so that the arm 178 will stand in position to be engaged by a corner of the fly when the fly is indexed for the lacing of a second side. Similarly, in the indexing of the fly for the lacing of the third side, the arm 179 will be engaged, and in the indexing of the fourth and final side, the arm 180 will be engaged. The engagement of a fly with one of the arms 178, 179 and 180 causes one revolution of the pinion 156 and the crank arm 155, with consequent retraction of the latch 145. There being no fourth arm opposite the arm 179, inadvertent indexing of the fly subsequent to the lacing of the fourth side will not cause retraction of the latch 145.

Means is provided to prevent the shaft 158 from being turned through more than ninety degrees by a vigorous turn of the fly as it is being indexed. Said means comprises a ring 181 (Figs. 22 and 23) fixed to the spur gear 157 and having upon its periphery four equidistant stop lugs 182 adapted to engage the rod 37. With the parts in initial position, as illustrated in Fig. 22, one of the lugs 182 lies at the upper side of the rod 37, the spring 153 (Fig. 13) serving to hold said lug against said rod. When a new fly is pushed past the finger 168 and into engagement with the arms 31 and 32, the pawl 161 turns the shaft 158, disk 159, spur gear 157 and ring 181 in the direction indicated by the arrow in Fig. 22, thereby placing the next lug 182 against the lower side of the rod 37. When the operator lowers the arms 31 and 32 to place the fly upon the comb, the rod 37 pushes its way past the lug 182, the ring 181 turning backward sufficiently to allow the rod to pass, after which the spring 153 returns the ring to the position shown in Fig. 23. The first side of the fly having been laced, the fly is raised, the rising of the rod 37 into contact with the lower side of the lug 182 causing the star wheel to turn a slight distance in the direction indicated by the arrow in Fig. 22. When the fly is turned or indexed through ninety degrees, engagement of one corner of the fly with the arm 178 causes the star wheel to turn until the next lug 182 stops against the lower side of the rod 37. In this manner the rod 37 and the lugs 182 prevent the shaft 158 from turning through more than a quarter-revolution through momentum or otherwise.

Before an attempt is made to return the carriage C into position beneath the first skein, it is important that the knotter shall have completed the tying of the ends of the lace of the twelfth skein, and that the lacing mechanisms on the carriage shall occupy their initial position in readiness to resume operation. If, therefore, when the brake 67 is applied the machine stops before the knotting and lacing mechanisms A have come to rest in their initial position, the carriage should not be unlatched to the action of the springs 76 until the knotting and lacing mechanisms have been manually brought to initial position. For this reason I provide the means shown at the left-hand end of Fig. 11, said means comprising a detent 183 pivoted to the carriage C at 184 and yieldingly held in normal position by means of an expansive spring 185. A latch 186 is pivoted at 187 on the base 1 in position to engage the detent 183 when the carriage comes to rest at the thirteenth position. 188 is a stop to limit gravitating movement of the latch 186. Upon the main shaft 189 of the carriage C is fixed a disk 190 having a tapered periphery to ride under a projection 191 carried by an arm 192 which is rigid with the latch 186. The disk 190 makes one revolution for each cycle of operations of the lacing and knotting mechanisms, i. e., for the operations required in lacing a skein and returning to initial position. The disk 190 is mounted in such position that when the carriage is held by the latch 68 in the thirteenth position the projection 191 is in a vertical plane extending transversely of the shaft 189 and through the portion of the disk 190 which is of greatest diameter. In the periphery of the disk 190 is a notch 193 (Fig. 7) so located with reference to the projection 191 that when the lacing and knotting mechanisms on the carriage C are in their initial position said notch is in position to receive said projection. It will be seen that if the lacing and knotting mechanisms on the carriage C come to rest in their initial position, the projection 191 will drop into the recess 193, whereby the latch 186 is held out of engagement with the detent 183, and that if the brake 67 acts so promptly as to stop the knotting and lacing mechanisms before they have returned to initial position, the projection 191 will rest upon the elevated portion of the disk 190 and will thus hold the latch 186 in engagement with the detent 183. In the later contingency, the operator cannot restart the machine until he has manually turned the shaft 189 to bring the bottom of the notch 193 into register with the projection 191. As indicated in Fig. 11, the members 183 and 186 are hooked. If the operator releases the latch 68 while the latch 186 is held elevated by the disk 190, the detent 183 will move with the carriage C until the hooks on the detent 183 and the latch 186 are interengaged. The latch 183 has a beveled forward end to enable it to pass the latch 186 if the latter should be up when the latch 183 reaches it.

In practice, a supply of flies is maintained in convenient position adjacent to the front side of the machine. Assuming that the machine is idle, the carriage C being held in the thirteenth position by the latch 68, and assuming further that the fly-lifting arms 31 and 32 are in their upper positions wherein the channeled ends of said arms are in operative alinement with the ledges 25 and 26: The operator takes a fly, places it upon said ledges and pushes it rearwardly until the ends of the shaft of the fly stop against the stops 29 and 30. In the rearward movement of the fly the arm 168 is swung into the position shown in Fig. 13, thereby causing retraction of the latch 145. When the ends of the shaft of the fly stop against the portions 29 and 30 the shaft ends are within the channeled ends of the arms 31 and 32. With one hand the operator maintains the fly with its lower side in a horizontal plane while with the other he grasps the hand rod 35 and pulls said hand rod forward and down, thereby lowering the fly onto the comb. The elements of the comb teeth close together before the skeins touch the teeth and then the movable elements are rapidly oscillated through a short arc as the fly descends, whereby the teeth work their way through the skeins without injuring the silk. The operator then swings the hand lever 74 (Fig. 8) to the right. If the fly is as far down on the comb as it should be, there will be no obstruction to the movement of said hand lever, and movement will be communicated from the hand lever 74 through the bar 73 and the lever 72 to disengage the latch 68 from the block 69. The springs 76 thereupon drive the carriage C toward the left (Fig. 1) until the carriage is in operative relation to the skein farthest to the left. As the carriage approaches such position, the block 55$^a$ (Fig. 14) engages the front end of the latch 145 and releases said latch from the locking shoulder 176 (Fig. 10), whereby the spring 147 is permitted to project the latch 145 into the position shown in Fig. 10. As the carriage reaches operative relation to the skein farthest to the left, the high point of the cam 98 passes the projection on the lever 95, whereupon the spring 97 operating through the arms 95 and 91, the dog 92, the lug 93, the arm 89 and the fork 87, throws in the clutch 65 and releases the brake 67. Power is thereby communicated to the shaft 60 to drive the mechanisms on the carriage C and to drive the shaft 59. As the latter begins to revolve, the cam flange 134 engages the anti-friction roller 135 and thereby causes the shaft 59 to be pushed forward to bring the crank roller 57 into position to engage the successive blocks 55 and thus impart a step-by-step movement to the carriage C from one skein to the next. As the carriage approaches the thirteenth position the block 148 (Fig. 10) passes the latch 145, the latch 68 engages the block 69, and the carriage strikes the stop screw 104 (Fig. 5), whereby the reciprocating slotted bar 111 is lowered into engagement with the lever 119, said lever 119 thereby being withdrawn from the lever 122, and the spring 124 being thereby permitted to draw the shaft 59 rearwardly to move the roller 57 from the vertical plane of the blocks 55.

When the shaft 59 is thus drawn rearwardly, the cam projection 126 engages the projection on the lever 127 (Fig. 16), thereby disengaging the dog 92 from the lug 93, whereupon the spring 90 throws out the clutch 65 and applies the brake 67, thereby bringing the machine to a stop. The operator then raises the hand rod 35 until the fly-lifting arms stop against the upper ends of the openings in the guide 38 (Fig. 5), thereby raising the fly clear of the comb and into the position shown in Fig. 13. As the fly is being raised, the movable elements of the comb teeth are oscillated until the skeins are clear of the teeth, whereupon the teeth open wide to allow the laces to be withdrawn from the comb. The fly having been raised, the operator gives the fly a quarter turn. In the turning movement of the fly a corner thereof engages the arm 178 of the star wheel, thereby causing the crank arm 155 to turn through one revolution, thus retracting the latch 145 and placing it in engagement with the locking shoulder 176. Having thus indexed the fly, the operator lowers it onto the comb and then operates the hand lever 74 to restart the machine.

After all four sides of the fly have been laced, the operator raises it by raising the hand rod 36 and then grasps the fly and draws it forwardly on the ledges 25 and 26. As the right-hand end of the shaft $b$ of the fly passes the finger 169, the pawl 161 is given its rearward stroke into the position shown in Fig. 22 so as to be ready to operate the latch 145 when the next fly is placed in the machine.

Although I have described the present embodiment of the invention with considerable particularity, it should be understood that such detailed description has been given for the sake of clearness of understanding and not for the purpose of limiting the invention to the details described. Various modifications may be made in the construction and relative arrangement of the several mechanisms without departing from the spirit and scope of the invention as defined in the appended claims.

Certain features herein disclosed are the invention of Russell P. Drake and are claimed in his application Serial No. 231,680, filed November 7, 1927.

I claim as my invention:

1. In a skein-lacing machine, the combination of two slides having on their adjacent sides horizontal ledges to support the ends of the shaft of a fly, said slides having vertical slots at the inner ends of said ledges, a comb below and in the vertical plane of said slots, two arms having elongated recesses adapted to be alined with said ledges, said arms extending across said slots, and means for adjusting said slides and arms toward and away from each other in accordance with variations in the length of flies.

2. In a skein-lacing machine, the combination of two slides having on their adjacent sides horizontal ledges to support the ends of the shaft of a fly, said slides having vertical slots at the inner ends of said ledges, a comb below and in the vertical plane of said slots, and means for relatively moving said slides toward and away from each other to vary the distance between said ledges.

3. In a skein-lacing machine, the combination of two members to support the ends of the shaft of a fly, lacing means movable step by step in accordance with the spacing of the skeins on the fly, and means for relatively moving said members toward and away from each other while maintaining the same relation between the skeins on a fly and the step by step positions of said lacing means.

4. In a skein-lacing machine, the combination of two members to support the ends of the shaft of a fly, a comb the teeth of which are spaced to correspond with the spacing of the skeins on the fly, and means for relatively moving said members toward and away from each other while maintaining the proper relation to the comb of a fly supported on said members.

5. In a skein-lacing machine, the combination of a comb upon which a fly may be seated, mechanism to lace the skeins carried by the fly, mechanism for moving said lacing mechanism along the fly, a hand lever for controlling the second mentioned mechanism, and means for automatically preventing operation of said lever if the fly is not properly seated on the comb.

6. In a skein-lacing machine, the combination of a comb upon which a fly may be seated, mechanism to lace the skeins carried by the fly, mechanism for moving said lacing mechanism along the fly, a hand lever for controlling the second mentioned mechanism, a slide bar extending along the comb and connected to the hand lever, two feelers, one near each end of the comb, arranged to be moved through contact with a fly properly seated on the comb, said feelers having parts adapted to obstruct movement of the slide bar, and spring means tending to move the feelers to place said parts in obstructing position.

7. In a skein-lacing machine, the combination of a lacing carriage, means including a clutch for imparting a working stroke to said carriage, means for imparting a return stroke to the carriage, a cam having a one-way driving connection with the last mentioned means, a lever movable in one direction to throw in the clutch, and a spring for moving the lever in said direction, said cam being arranged to move the lever in the opposite direction.

8. In a skein-lacing machine, the combination of a lacing carriage, means for imparting a working stroke to said carriage, means for imparting a return stroke to the carriage, a cam having a one-way driving connection with the last mentioned means, and mechanism controlled by said cam for controlling the first mentioned means.

9. In a skein-lacing machine, the combination of a comb, manually-actuated means for placing a fly on the comb and for removing the fly, said comb comprising vibratory tooth-sections, and means actuated by said manually-actuated means for vibrating said tooth-sections.

10. In a skein-lacing machine, the combination of a comb comprising vibratory tooth-sections, means for vibrating the tooth-sections comprising a pivoted cam, means for moving a fly into and out of operative relation to the comb, and means actuated by said fly-moving means for oscillating the cam.

11. In a skein-lacing machine, lacing mechanism, two fly-supporting arms pivoted rearwardly of said mechanism, said arms extending forward over said mechanism and being adapted to engage the ends of the shaft of a fly, and manual means for raising and lowering said arms.

12. In a skein-lacing machine, lacing mechanism, two fly-supporting arms pivoted rearwardly of and extending forwardly over said mechanism, the forward ends of said arms being adapted to engage the ends of the shaft of a fly, and a hand rod connected to said arms and supported over said mechanism and accessible from the front of the machine for raising and lowering said arms.

13. In a skein-lacing machine, lacing mechanism, two fly-supporting arms pivoted rearwardly of and extending forwardly over said mechanism, the forward ends of said arms being adapted to engage the ends of the shaft of a fly, a hand rod connected to said arms and supported over said mechanism and accessible from the front of the machine for raising and lowering said arms, and a counterweight for said arms and hand rod and the fly.

14. The combination of a comb, manual means above the comb for setting a fly on the comb and for removing it from the comb, a single lacing means beneath the comb, and means located at one end of the comb for reciprocating the lacing means lengthwise of the fly.

In testimony whereof I have hereunto affixed my signature.

HOWARD D. COLMAN.